(12) United States Patent
Gempel et al.

(10) Patent No.: US 11,365,580 B2
(45) Date of Patent: Jun. 21, 2022

(54) METHOD AND ADJUSTING DEVICE FOR ADJUSTING A VEHICLE ADJUSTING PART WITH OUTPUT STATUS INFORMATION

(71) Applicant: BROSE FAHRZEUGTEILE GMBH & CO. KOMMANDITGESELLSCHAFT, BAMBERG, Bamberg (DE)

(72) Inventors: Matthias Gempel, Bamberg (DE); Manfred Stenzel, Bamberg (DE)

(73) Assignee: BROSE FAHRZEUGTEILE GMBH & CO. KOMMANDITGESELLSCHAFT, BAMBERG, Bamberg (DE)

( * ) Notice: Subject to any disclaimer, the term of this patent is extended or adjusted under 35 U.S.C. 154(b) by 144 days.

(21) Appl. No.: 16/692,357

(22) Filed: Nov. 22, 2019

(65) Prior Publication Data
US 2020/0165860 A1     May 28, 2020

(30) Foreign Application Priority Data
Nov. 23, 2018   (DE) .................... 10 2018 220 145.5

(51) Int. Cl.
*B60R 22/00*     (2006.01)
*E05F 15/73*     (2015.01)
(Continued)

(52) U.S. Cl.
CPC ............. *E05F 15/73* (2015.01); *B60N 2/90* (2018.02); *B60N 2002/981* (2018.02);
(Continued)

(58) Field of Classification Search
CPC ..... E05F 15/73; B60N 2/90; B60N 2002/981; B60Q 9/008; E05Y 2900/531; E05Y 2900/546
(Continued)

(56) References Cited

U.S. PATENT DOCUMENTS 10,037,472 B1 * 7/2018 Chen ..................... G01S 13/867
10,176,368 B1 * 1/2019 Ramakrishnan ........ E05F 15/73
(Continued)

FOREIGN PATENT DOCUMENTS

CN     104521143 A    4/2015
CN     104727691 A    6/2015
(Continued)

*Primary Examiner* — Kerri L McNally
*Assistant Examiner* — Thang D Tran
(74) *Attorney, Agent, or Firm* — Brooks Kushman P.C.

(57) ABSTRACT

A method for adjusting an adjusting part on a vehicle, wherein a possible obstacle in an adjustment path of the adjusting part which is to be adjusted can be detected by means of at least one sensor device, in order to block, stop and/or reverse an adjustment movement of the adjusting part. There is provision that at least one status indicator for the at least one sensor device is generated electronically, by means of which data indicator at least two different first and second operating states of the sensor device can be signaled, and for the adjustment movement of the adjusting part at least one current status information item of at least two different status information items relating to the current operating state of the at least one sensor device is signaled in accordance with the status indicator, in order to be perceived by a user.

19 Claims, 3 Drawing Sheets

(51) Int. Cl.
*B60Q 9/00* (2006.01)
*B60N 2/90* (2018.01)

(52) U.S. Cl.
CPC ......... *B60Q 9/008* (2013.01); *E05Y 2900/531* (2013.01); *E05Y 2900/546* (2013.01)

(58) Field of Classification Search
USPC .............................................. 340/49; 701/49
See application file for complete search history.

(56) References Cited

U.S. PATENT DOCUMENTS

| | | | | |
|---|---|---|---|---|
| 2001/0035725 A1* | 11/2001 | Mintgen | ................ | B62D 25/12 318/445 |
| 2002/0196131 A1* | 12/2002 | McCarthy | ............... | E05B 81/64 340/425.5 |
| 2003/0155081 A1* | 8/2003 | Goodman | ................ | E05F 15/40 160/84.02 |
| 2004/0124662 A1* | 7/2004 | Cleland | ................ | E05F 15/43 296/146.4 |
| 2004/0139656 A1* | 7/2004 | Takeda | ................ | E05F 15/63 49/340 |
| 2004/0139658 A1* | 7/2004 | Marshall | ............... | E05F 15/643 49/352 |
| 2004/0212334 A1* | 10/2004 | Kawanobe | ............ | E05F 15/611 318/280 |
| 2005/0085972 A1* | 4/2005 | Martinez | ................ | E05C 17/00 701/49 |
| 2005/0107040 A1* | 5/2005 | Oberhauser | ............ | E05F 15/76 455/70 |
| 2006/0181108 A1* | 8/2006 | Cleland | ................ | E05F 15/43 296/146.4 |
| 2006/0202815 A1* | 9/2006 | John | ....................... | G08B 21/14 340/5.71 |
| 2007/0214725 A1* | 9/2007 | Miyashita | ............... | E05F 15/79 49/340 |
| 2008/0319671 A1* | 12/2008 | Subelet | ................ | G08G 5/045 701/301 |
| 2009/0173006 A1* | 7/2009 | Jitsuishi | ................ | E05F 15/40 49/31 |
| 2012/0153787 A1* | 6/2012 | Busalt | ................ | E05F 15/63 312/236 |
| 2013/0099524 A1* | 4/2013 | Brown | ................ | E05F 15/605 296/146.9 |
| 2013/0234844 A1* | 9/2013 | Yopp | ....................... | B60Q 9/008 340/435 |
| 2014/0039766 A1* | 2/2014 | Miyake | ................ | B60R 25/245 701/49 |
| 2014/0207344 A1* | 7/2014 | Ihlenburg | ................ | E05F 15/74 701/49 |
| 2014/0218521 A1* | 8/2014 | Tanaka | .................... | B60R 25/01 348/148 |
| 2014/0311173 A1* | 10/2014 | Nilles | ..................... | A47F 3/043 312/405 |
| 2015/0025751 A1* | 1/2015 | Sugiura | ..................... | B60J 5/06 701/49 |
| 2015/0275561 A1* | 10/2015 | Herrmann | ............ | H03K 17/955 701/49 |
| 2016/0314362 A1* | 10/2016 | Elie | ......................... | E05F 15/43 |
| 2016/0348415 A1* | 12/2016 | Baumgarte | ............ | G01B 7/003 |
| 2017/0044816 A1* | 2/2017 | Salter | ....................... | B60J 5/101 |
| 2017/0182933 A1* | 6/2017 | Kiriyama | ............ | B60Q 1/0023 |
| 2017/0241182 A1* | 8/2017 | Hung | ....................... | E05F 15/46 |
| 2017/0241188 A1* | 8/2017 | Kalhous | ................. | E05F 15/77 |
| 2017/0247926 A1* | 8/2017 | Elie | ......................... | E05F 15/73 |
| 2017/0247927 A1* | 8/2017 | Elie | ......................... | E05F 15/611 |
| 2017/0342761 A1* | 11/2017 | Conner | .................... | E05F 15/71 |
| 2018/0016836 A1* | 1/2018 | Ibsies | ....................... | E05B 41/00 |
| 2018/0030771 A1* | 2/2018 | Washeleski | ............ | E05F 15/40 |
| 2018/0107473 A1* | 4/2018 | Ahmed | .................... | G06F 8/654 |
| 2018/0209195 A1* | 7/2018 | Battlogg | ................. | F16D 57/06 |
| 2018/0292506 A1* | 10/2018 | Bjorkengren | ...... | G07C 9/00309 |
| 2018/0314914 A1* | 11/2018 | Kuriyama | ............ | G06K 9/6267 |
| 2018/0370487 A1* | 12/2018 | Ishikawa | ................. | G08C 17/02 |
| 2019/0024430 A1* | 1/2019 | Jeromin | ................. | G06K 9/00805 |
| 2019/0051129 A1* | 2/2019 | Hunt | ....................... | G01R 33/0023 |
| 2019/0063139 A1* | 2/2019 | Brogan | .................... | B60J 5/0411 |
| 2019/0078370 A1* | 3/2019 | Pohl | ......................... | E05F 15/79 |
| 2019/0109988 A1* | 4/2019 | Lin | ........................... | G06T 7/33 |
| 2019/0145147 A1* | 5/2019 | Takenaka | ............ | E05F 15/659 701/49 |
| 2019/0145150 A1* | 5/2019 | Kidena | .................... | G06N 20/00 701/49 |
| 2019/0323280 A1* | 10/2019 | Ghannam | ............... | E05F 15/42 |
| 2020/0332586 A1* | 10/2020 | Soderqvist | ............. | E05F 15/73 |

FOREIGN PATENT DOCUMENTS

| | | |
|---|---|---|
| CN | 106004754 A | 10/2016 |
| CN | 107064721 A | 8/2017 |
| CN | 107107870 A | 8/2017 |
| CN | 107407122 A | 11/2017 |
| DE | 102012107800 A1 | 2/2014 |
| DE | 102016211054 A1 | 12/2017 |
| EP | 0968863 A1 | 1/2000 |
| JP | 2004027752 A | 1/2004 |
| WO | 9713948 A1 | 4/1997 |

\* cited by examiner

METHOD AND ADJUSTING DEVICE FOR ADJUSTING A VEHICLE ADJUSTING PART WITH OUTPUT STATUS INFORMATION

CROSS-REFERENCE TO RELATED APPLICATIONS

This application claims priority to German Patent Application No. DE 10 2018 220 145.5, filed on Nov. 23, 2018, the disclosure of which is hereby incorporated in its entirety by reference herein.

TECHNICAL FIELD

The present disclosure relates to a method and to a device for the extraneous-force-activated adjustment of an adjusting part on a vehicle.

BACKGROUND

It is known to control an adjustment movement of an adjusting part on a vehicle, such as for example a vehicle door, either on a side or rear of a vehicle, a sunroof, or a vehicle seat, by means of an adjusting device. A process to control the adjustment of an adjusting part may involve using at least one sensor device to detect a possible obstacle in an adjustment path of the adjusting part to be adjusted. If an obstacle is detected in the adjustment path by means of the at least one sensor device, the adjustment movement can be automatically blocked, stopped and/or reversed. Corresponding adjusting methods and adjusting devices therefore serve to protect against collision, in order, in particular, to avoid body parts or other objects becoming trapped between the adjusting part to be adjusted and, for example, a fixed frame of the vehicle. Such methods and devices are, however, also used to detect obstacles which lie in the adjustment path during the opening of an adjusting part, in order to avoid damage owing to a collision of the adjusting part with the obstacle.

SUMMARY

One or more objects of the present disclosure may be to provide an improved method and a device for extraneous-force-activated adjustment of an adjusting part on a vehicle.

As an example, the present disclosure may provide a proposed method that may include at least one status indicator for a one sensor device is generated electronically, by means of which status indicator at least two different first and second operating states of the sensor device can be signaled, and for the adjustment movement of the adjusting part at least one current status information item of at least two (possible) different status information items relating to the current operating state of the at least one sensor device is signaled in accordance with the status indicator, in order to be perceived by a user.

For example, in this way it may be possible for a current operating state of the sensor device to be perceived on the vehicle for a user of the adjusting device, so that the user receives information about the operating state which the at least one sensor device monitoring the adjustment device is in, and, for example, the degree of measuring certainty this sensor device is currently able (given the prevailing sensed ambient conditions and boundary conditions) to detect, with sufficient probability, an obstacle in the adjustment path of the adjusting part which is to be adjusted. The current status information which is outputted may provide a user of the adjusting device with conclusive information and to some extent the user may be obliged to monitor the adjusting movement, driven with extraneous force activation, of the adjusting part, in order when necessary to be able to intervene himself/herself and interrupt the adjustment movement of the adjusting part.

An operating state of the sensor device which is signaled via the current status information closes here, such as, a degree of measuring uncertainty which is based on preceding measured values, i.e. previously measured ones, and e.g. a standard deviation of measured values such as a standard deviation in comparison with a reference value or in comparison with a difference between one or more measured values and a respective stored reference value which is expected (for the respective adjustment position of the adjusting part). The standard deviation to be taken into account can basically be a chronological standard deviation for e.g. the distance information in a specific direction. The standard deviation to be taken into account can, however, also relate to a plurality of measured values relating to spatially spaced-apart locations. If the sensor device comprises, for example, a 3D sensor and if minimum distances, intended for specific spatial directions, are defined for distance measurements, an adjustment of the adjusting part is to be blocked if these minimum distances are not complied with. If the standard deviation of the measured values is, however, then e.g. of the order of magnitude of the difference between the measured value and the minimum distance, an unreliable measurement is to be assumed and the status indicator is correspondingly adapted. A criterion for the adaptation of the status indicator can also be the uncertainty of a plurality of adjacent measured values or of measured values which are linked in some other way.

In addition, a measured value history can also be used for the sensor device in order to make it possible to infer a changed operating state and therefore a status indicator which is to be adapted. It is therefore possible to, for example, infer increasing degradation of the sensor of the sensor device on the basis of a measured value history.

A status indicator to be adapted can alternatively or additionally be obtained from a test run or calibration run which is carried out by the user. It is therefore possible, e.g. for a capacitive trapping prevention means which is to be made available with the sensor device on an adjusting part, such as e.g. a tailgate, that shortly after a user has expressed an operator control request for adjusting the adjustment part, a test measurement or calibration measurement will be carried out during an adjustment. This test measurement or calibration measurement can be compared with stored reference values. Deviations therefrom then make it possible to infer e.g. that there is contamination/wetting of the measuring area, e.g. with water, and consequently that there is a changed operating state which is signaled to a user via the status information.

The at least two different status information items may be signaled for the adjustment movement of the adjusting part, such as, during and/or before the adjustment movement of the adjusting part, in a way which may be perceived visually, acoustically and/or haptically by the user. For example, the different status information items may be signaled in a way which may be perceived visually, acoustically and/or haptically by a user on the vehicle and, such as, on the adjusting part and/or on a device that may be carried by the user, such as a mobile terminal or radio key, so that the user of the adjusting device is informed about the current operating state of the sensor device when he/she has triggered an extraneous-force-activated adjustment of the adjusting part on or in the vehicle.

For example, visually perceptible signaling occurs via at least one display element, such as a lighting means and/or a display, or a lighting means and/or a display on the vehicle or beyond the vehicle. A lighting means may irradiate light, for example, in different colors, depending on the operating state which the sensor device is currently in and the value with which a status indicator has been produced or the type of status indicator which has been produced. If, for example, a corresponding lighting means lights up in green, it is to be assumed that the sensor device is currently hardly impaired or is not impaired and the detection of an obstacle occurs at a high level of certainty. If, in contrast, the lighting means lights up, for example, in orange, impairment is present. In the case of a lighting means which lights up in red, the accuracy of the obstacle selection is adversely effected to a considerable degree and an increased degree of attentiveness by the driver himself/herself is required.

For acoustically perceptible signaling it is possible, for example, to provide a loudspeaker element. In this context, for example different sound signals or announcements are used to communicate to the user which operating state of the at least one sensor device monitoring the adjustment movement is to be assumed.

In one embodiment variant during the extraneous-force-activated adjustment movement of the adjusting part, different status information items are each signaled in a haptically perceptible fashion to a user via at least one temporarily different adjustment characteristic during the extraneous-force-activated adjustment movement of the adjusting part. Depending on the detected operating state in which the at least one sensor device is in, the adjustment movement, for example, is then varied with respect to its speed, the level of acceleration of the adjustment movement, a time for acceleration of the adjustment movement and/or the intensity of a vibration of the adjusting part which is superimposed on the adjustment movement. If it can be detected electronically on the basis of the ambient conditions and/or boundary conditions that an obstacle detection process using the at least one sensor device is subject to a significant level of uncertainty, and therefore, for example, it cannot be readily concluded, on the basis of a measurement signal acquired by means of the at least one sensor device, whether there is actually an obstacle in the adjustment path or not, the adjustment movement is, for example, automatically stopped, occurs with a significantly reduced speed or with repeated brief stopping and starting and consequently in a "stuttering fashion", so that the user may recognize on the basis of the adjustment movement of the adjusting part haptically that the user himself/herself should carefully observe the adjustment movement.

Alternatively or additionally, an operating state may also be signaled in a way that may be perceived haptically by the user by virtue of the fact that during the adjustment movement of the adjusting part another vehicle component is driven with extraneous force activation. Therefore, for example, a vehicle seat for a user may be made to vibrate if this user who is sitting on the vehicle seat within the vehicle has triggered extraneous-force-activated adjustment of an adjusting part, such as for example a tailgate and a high degree of measuring uncertainty for the at least one sensor device is detected electronically.

Of course, more than two different operating states of the sensor device may also be signaled for the at least one sensor device via the at least one status indicator, for example different degrees of measuring (un)certainty and therefore not only two operating states such as "certain" and "uncertain".

Basically, the different operating states of the at least one sensor device may be indicative of the degree of certainty with which the at least one sensor device may currently detect an obstacle in the adjustment path of the adjusting part which is to be adjusted.

As has already been mentioned above, the different operating states may correspond here to different, predefined stages which specify in a graduated fashion the degree of measuring uncertainty with which an obstacle in the adjustment path of the adjustment path of the adjusting part to be adjusted may currently be detected via the at least one sensor device. Therefore, the different stages represent "high certainty", "medium certainty", "reduced certainty" and "uncertain", and these different stages may be signaled to a user by means of different status information items.

The at least one status indicator may be generated on the basis of at least one signal of at least one further sensor device. In one embodiment variant, the electronic generation of the at least one status indicator therefore depends on a measurement signal of at least one further sensor device. This at least one further sensor device may also be configured and provided here for monitoring an adjustment movement of the adjusting part.

Alternatively or additionally, at least one further sensor device may be part of a system on the vehicle which is at least not primarily configured and provided for obstacle detection and/or collision prevention.

For example, the at least one sensor device for monitoring an adjustment movement of the adjusting part permits a directly or indirectly detecting obstacle detection process. The at least one further sensor device may permit an indirectly or directly detecting obstacle detection process. Consequently, an assisting sensor system which is of the same type or operates differently may be provided with the at least one further sensor device, in order to estimate electronically to what extent an obstacle detection process with the at least one sensor device is subject to an uncertainty level. Therefore, for example the at least one further sensor device may be configured and provided for measuring peripheral conditions, such as for example ambient light, reflection (e.g. on the ground) and/or weather conditions. The at least one further sensor device consequently generates a signal for the status indicator, which signal is dependent on the ambient conditions and/or boundary conditions, and transmits it to a superordinate control electronic system.

Alternatively, uncertainty may also be generated during the measurement by the at least one sensor device from other measurement information, for example from a chronological comparison of measurement results, any possible transgression of one or more limiting values or any possible errors during the calibration of the adjusting device.

In one embodiment variant, a proposed method provides, for example, that during an obstacle detection process it is made possible for a limiting range for the certainty of the at least one sensor device to be communicated to the user in a perceptible fashion in that it is signaled to the user that the obstacle detection has "difficult" detection conditions and, for example:

automatic opening and closing of the adjusting part takes place with a high level of certainty during the obstacle detection, automatic opening and/or closing, to be monitored by the user, take place at a normal speed, automatic opening and/or closing, to be monitored by the user, take place with a reduced speed, or manual operation takes place without a (collision prevention) sensory system or at most with additional collision prevention information.

Then, for example the combination, mentioned above, of a direct object detection process (for example with measurement of a distance of an adjusting part, such as for example of a door, from an obstacle) with an indirect object detection process (for example with the sensing of a reflection from the ground) is used for the determination of the limiting range.

The current status information may be signaled basically before and/or during an adjustment movement of the adjustment part, in a way which may be perceived by a user. In addition, the current status information for an extraneous-force-activated adjustment movement of the adjusting part may be signaled in a way which may be perceived by a user. Alternatively or additionally there may be provision that the current status information for an adjustment movement which takes place or is to take place by means of an adjustment force which is applied by the user himself/herself is signaled in a way which may be perceived by a user. In the last-mentioned case, for example manual adjustment of the adjusting part may be blocked by means of a brake device and therefore the adjusting part is locked if an obstacle is detected in the desired adjustment path. By means of the current status information it is then possible here to signal to a user the degree of measuring uncertainty with which such a current obstacle is detected and/or that currently no blocking of the adjustment is occurring owing to increased measuring uncertainty (even though an obstacle may be present).

A further aspect of the proposed solution relates to an adjusting device for the extraneous-force-activated adjustment of an adjusting part on a vehicle.

An adjustment movement of the adjusting part may be controlled by means of the adjusting device. A possible obstacle in an adjustment path of the adjusting part to be adjusted may be detected via at least one sensor device of the adjusting device, in order to block, stop and/or reverse the adjustment movement, if an obstacle is detected via the at least one sensor device. The proposed adjusting device also comprises an electronic control system which is configured to generate at least one current status indicator for the at least one sensor device, via which status indicator at least two different, first and second operating states of the sensor device may be signaled, and for the adjustment movement of the adjusting part, to signal at least one current status information item of at least two (possible) different status information items relating to the current operating state of the at least one sensor device in accordance with the status indicator, which may be perceived by a user.

By means of a proposed adjusting device it is therefore possible, in a way analogous to a proposed method, to provide the user who is using the adjusting device with awareness as to the extent to which, if appropriate, the at least one sensor device which monitors the adjustment movement is subject to measuring uncertainty and therefore the user is also obliged to observe the adjustment movement of the adjusting part himself/herself.

By means of the adjusting device, the adjusting part may basically be adjustable with actuation by extraneous force here, and/or adjustment of the adjusting part by means of an adjusting force applied by a user himself/herself may be braked or prevented in an electronically controlled fashion.

A proposed adjusting device may be suitable for carrying out one or more of the proposed methods. Features and advantages of embodiment variants of a proposed method which are explained above and below therefore also apply to embodiment variants of a proposed adjusting device, and vice versa.

The adjusting device may be, for example, a side door, a tailgate, an engine hood, a passenger compartment component, a seat, a seat component, a trunk cover, a baggage/load securing means, an armrest, a steering wheel, a glovebox, a screen, a window or a sunroof.

BRIEF DESCRIPTION OF THE DRAWINGS

The appended figures illustrate by way of example possible embodiment variants of the proposed solution.

In the drawings.

DETAILED DESCRIPTION

Figure 1:
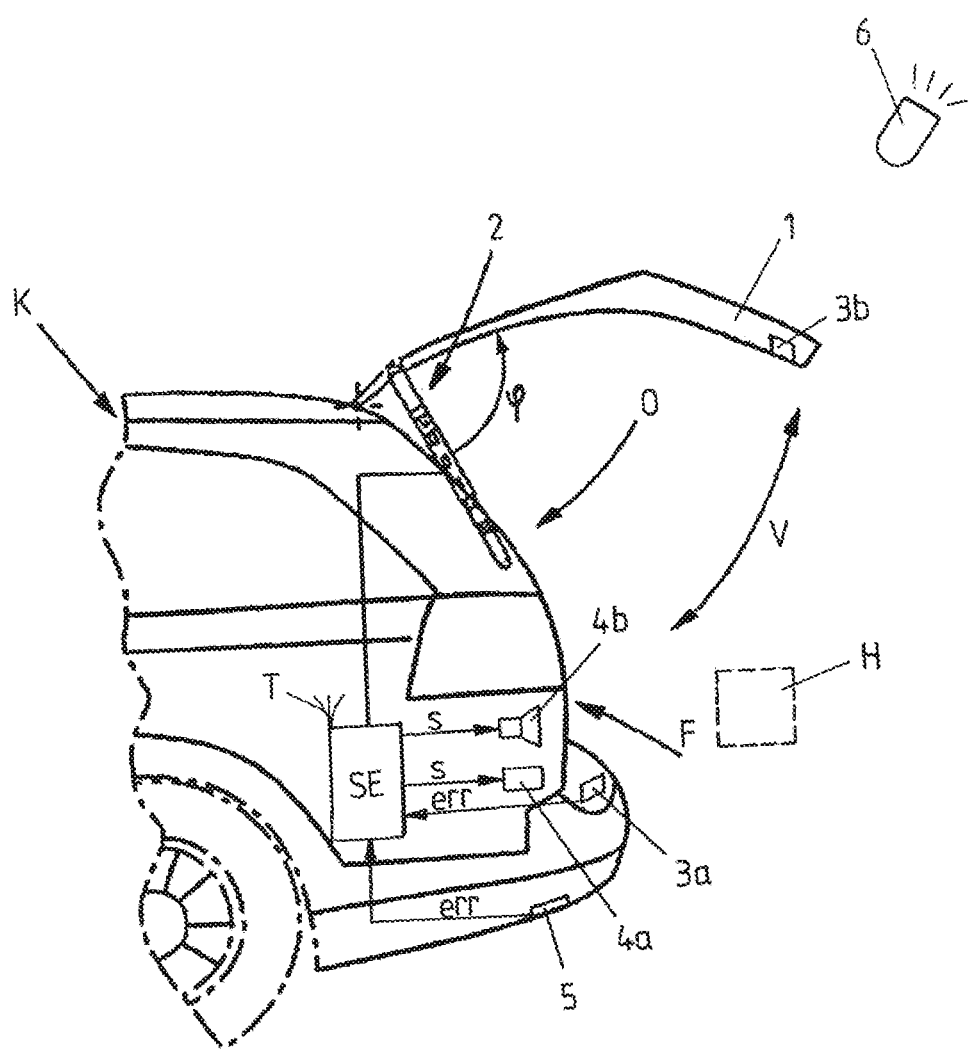
FIG. 1 shows a schematic view of a first embodiment of the proposed solution for adjusting a tailgate on a vehicle on which a detail is illustrated.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Different types of sensor devices are known for detecting any possible obstacle in an adjustment path.

Basically, differentiation is made e.g. between directly detecting and indirectly detecting sensor devices. An indirectly detecting system detects any possible obstacle e.g. on the basis of the monitoring of an operating variable (for example of a motor current or of a rotational speed) of a drive motor, driving the adjustment movement, of the adjusting device. Therefore, the presence of a possible obstacle is therefore inferred indirectly on the basis of a force which the obstacle located in the adjustment path opposes to the (further) adjustment of the adjusting part. The opposing force which is exerted by the obstacle causes the monitored operating variable to deviate from a predefined setpoint value profile and therefore indirectly permits the detection of the obstacle. The at least one sensor device can comprise here, for example, a Hall sensor on the drive motor of the adjusting device. Likewise, sensor devices with at least one force sensor are known, said sensor detecting a resistance when the adjusting part is adjusted, owing to contact with the obstacle.

However, indirectly detecting sensor devices are also understood here to be systems which sense the detection of an obstacle in the adjustment path of an adjusting part as result of the fact that the presence of the obstacle in the adjustment path is not sensed directly but rather instead, for example, the loss or at least the attenuation of a measurement signal which indirectly indicates the presence of an obstacle. This includes, for example, the visual monitoring of a piece of ground behind the vehicle and therefore behind a tailgate if this piece of ground can no longer be seen, it makes it possible to infer the presence of an obstacle behind the tailgate, with which obstacle the tailgate could collide during the opening process.

A directly detecting system provides, in contrast, the direct sensing of at least one characterizing measurement variable which is influenced by an obstacle and by means of which any obstacle in the adjustment path can also be detected without contact of the adjusting part with the obstacle. Directly detecting sensor devices comprise, for example, sensors which work in a contactless fashion, such as for example, at least one capacitive proximity sensor. A capacitive proximity sensor typically has an electrode arrangement with one or more sensor electrodes. An electrical field which changes in a way which can be measured by the presence of an obstacle is generated by means of the sensor electrodes.

In order to improve a method using capacitive proximity sensors, for extraneous-force-activated adjustment of an adjusting part on a vehicle, DE 10 2016 211 054 A1 proposes, for example, using, in particular with a view to avoiding incorrect triggering operations, at least one pre-warning threshold value in order to check for the presence of an obstacle in two stages by means of the proximity sensor.

However, in practice, irrespective of any incorrect triggering operations there is also the basic problem that users of corresponding adjusting devices on a vehicle for the extraneous-force-activated adjustment of an adjustment part understand associated assisting devices to be completely autonomously operating systems and as assistance systems in the actual sense which do not completely relieve the user of the need to monitor the function of the adjusting device and, in particular the adjustment movement which is driven thereby, and consequently to control said function. Therefore, in practice a user generally assumes that satisfactory obstacle selection is provided by means of the sensor system of the adjusting device if the desired adjusting part is adjusted driven by motor, since the user is not provided with any awareness of any measuring uncertainties of the sensor system.

FIG. 1 shows a detail of a vehicle F in a side view. In order to close an opening O in the bodywork at the rear of the vehicle F a tailgate 1 is mounted in a pivotable fashion as an adjusting part on a bodywork K of the vehicle F. The tailgate 1 is adjustable here under activation by extraneous force via an adjusting device 2. By means of the adjusting device 2, which comprises, for example, a spindle drive which acts on the tailgate 1 and has a drive motor, the tailgate 1 can be opened and closed in adjustment directions V. FIG. 1 shows here the tailgate 1 in an adjustment position which is pivoted outward about a pivoting angle φ and is consequently opened.

In order to avoid, during opening and/or closing of the tailgate 1, a situation in which the motor-driven tailgate 1 collides with an obstacle H, the adjusting device 2 here comprises a plurality of sensor devices 3a, 3b for contactless monitoring of an adjustment path of the tailgate 1. The sensor devices 3a and 3b each comprise, for example, sensor electrodes for forming a capacitive proximity sensor. One of the sensor devices 3a, 3b is provided by way of example on the bodywork side in the region of a bumper at the rear of the vehicle F. The other sensor device 3b is provided on the actual tailgate 1 which is to be adjusted.

Each sensor device 3a, 3b is respectively coupled to an electronic control system SE of the adjusting device 2, via which the adjusting device 2 and, such as, the drive motor thereof can be actuated in order to adjust the tailgate 1. The electronic control system SE may be configured to stop and/or to reverse an adjustment movement of the tailgate 1 when an obstacle H is detected in the adjustment path of the tailgate 1 to be adjusted, in order as result to avoid a collision with the obstacle H.

Sensor signals of the two sensor devices 3a and 3b can be evaluated by means of an evaluation logic of the electronic control system SE in order to detect boundary conditions and/or environmental conditions, which can possibly adversely affect the detection of an obstacle H in the adjustment path, in the region of the tailgate 1. For example, when the tailgate 1 is closed, which is monitored, for example, by the tailgate-side sensor device 3b an additional electronic signal err can be transmitted to the electronic control system SE using the bodywork-side sensor device 3a. This electronic signal err is ultimately not (additionally) evaluated to determine whether there is actually an obstacle H in the adjustment path of the tailgate 1 to be closed. Instead, for example the signal err which is additionally made available via the bodywork-side sensor device 3b is evaluated by the electronic control device SE to determine what extent a sensor signal or measurement signal which is supplied by the tailgate-side sensor device 3b can be subject to errors. The additional (sensor) signal err of the bodywork-side sensor device 3a can therefore be used for an evaluation as to the degree of measuring uncertainty with which an obstacle H can currently be detected in the adjustment path of the tailgate 1 to be closed, via the tailgate-side sensor device 3a which operates capacitively.

Alternatively or additionally, an additional sensor device 5 which (solely or also) transmits to the electronic control system SE a signal err which is indicative of the currently prevailing environmental conditions and/or boundary conditions and therefore permits automatic electronic evaluation of any uncertainty in a sensor signal which is supplied by tailgate-side sensor device 3b, can be provided fixed to the bodywork of the vehicle F. For example, the additional sensor device 5 is a directly detecting sensor, such as, an optical sensor via which, for example, the ambient light, reflection conditions and/or weather conditions, such as for example rain or fog, can be sensed.

By evaluating at the least one signal err which is transmitted additionally to the electronic control system SE and is indicative of any measuring uncertainties during the sensing of an obstacle H by the tailgate-side sensor device 3b, the electronic control device SE generates a status indicator s in the form of an electronic signal. This status indicator s is received by a display element 4a and/or a loudspeaker element 4b on the vehicle F. On the display element 4a, which is designed, for example, in the form of a lighting means or a display and/or by means of the loudspeaker element 4b the degree of measuring uncertainty to which the sensory monitoring using the tailgate-side sensor device 3b is subject is signaled in a way which can be perceived visually and/or acoustically by a user. Depending on the status indicator s, it is signaled here to a user, for example via the display element 4a and/or via the loudspeaker element 4b, whether (a) a high level of certainty is possible during the obstacle detection, (b) automatic closing, to be monitored by the user, at a normal speed is possible, (c) automatic closing, to be monitored by the user, with a reduced speed is possible or (d) only manual operation without a collision prevention sensor system or with only additional collision prevention obstacle information is possible. Via the display element 4a and/or the loudspeaker element 4b, the user is therefore provided with awareness that an obstacle H can be detected in the adjustment path of the tailgate 1 to be closed by the adjusting device 2 only with a certain measuring uncertainty level, and therefore the user is required also to monitor the adjustment movement himself/herself.

Alternatively or additionally to the signaling via the signal element 4a and/or via the loudspeaker element 4b, the electronic control device SE can be configured to actuate the motor drive of the adjusting direction 2, in order to vary the adjustment of the tailgate 1 in the direction of the closed position during the adjustment movement if a relatively high uncertainty level is detected electronically for the sensory detection of an obstacle H via the tailgate-side and/or bodywork-side sensor device 3a, 3b. For example, in this context the tailgate 1 is adjusted in the direction of the closed position by means of a stuttering adjustment movement, or an adjustment speed is reduced in comparison with an adjustment movement with a relatively high level of certainty. Alternatively or additionally, for example a vehicle seat, from which the user currently controls the closing of the tailgate 1, is made to vibrate by means of the electronic control device SE, and the user is therefore informed in a different, haptic fashion about any uncertainty.

In one embodiment variant, signals of a plurality of sensor devices 3a and 3b are used for the object detection. Only if an obstacle detection process is evaluated as unimpaired on the basis of each signal or of a minimum number of signals of the sensor devices 3a, 3b to be taken into account, it is signaled that an obstacle H is present. If a plurality of signals gives rise to results which are not sufficiently similar or are highly different (e.g. relating to the distance and/or the size of the obstacle H), e.g. their measured values differ from one another by a predefined maximum value, the obstacle detection is evaluated as highly impaired and a correspondingly changed status indicator s is signaled.

The signaling of any uncertainty in the sensory monitoring for a possible obstacle H in the adjustment path of the tailgate 1 can also be carried out in a multistage fashion so that depending on the degree of measuring uncertainty various status indicators s and consequently different status information can be signaled in a plurality of different stages via the display element 4a and/or the loudspeaker element 4b and/or via an adjustment characteristic during the adjustment of the tailgate 1. For example, the motor-driven adjustment of the tailgate 1 is slower the higher the uncertainty level.

Of course, visual, acoustic and/or haptic signaling processes can also be combined with one another. For example, a lighting means lights up in green as a display element 4a with a high level of certainty. When there is a relatively high level of measuring uncertainty, the lighting means lights up in orange. When a high level of measuring uncertainty is detected, which is, for example, above a specific stored probability value, the lighting means lights up in orange and a warning tone is output via the loudspeaker element 4b. If the sensory monitoring is even categorized as "uncertain", a change in the adjustment characteristic additionally takes place during the adjustment of the tailgate 1, for example such as by stopping the motor-driven adjustment.

Alternatively or additionally, visual, acoustic and/or haptic signaling can also take place at a mobile device, e.g. a mobile terminal 6, such as a Smartphone or a radio key which is associated with the vehicle F. A corresponding status indicator s is then transmitted here e.g. in a wireless fashion by means of a sender or transmitter of the electronic control system SE to the mobile device.

Figure 2:
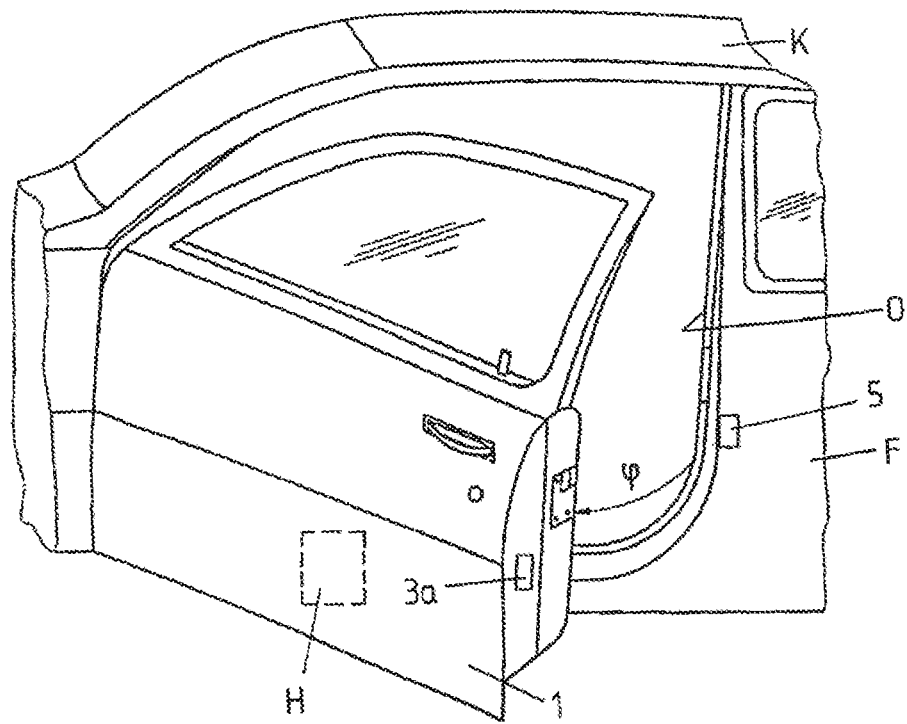
FIG. 2 shows a detail of a vehicle with a view of a pivotable side door which may be adjusted using the proposed solution.

FIG. 2 illustrates a possible further embodiment variant of the proposed solution in which, instead of the tailgate 1, a side door 1 can be adjusted as an adjusting part. The method of functioning of an adjusting device for extraneous-force-activated adjustment of the side door 1 as well as sensor devices 3a and 5 which are provided (and which detect direct and/or indirectly) corresponds here to the previously described method of functioning of a tailgate 1. In the embodiment variant in FIG. 2, a (first) sensor device 3a, for example in the form of at least one sensor electrode of a capacitive proximity sensor, is also provided, for example, on the adjusting part itself. For example a directly detecting sensor is provided as an additional sensor device 5 on a bodywork-side frame which spans an opening O in the bodywork which is to be closed by the vehicle door 1, on the vehicle F.

In the variant in FIG. 2, there can alternatively or additionally be provision that an adjustment of the side door 1 which is triggered or driven by the user is braked or prevented under electronic control if an obstacle H is detected in the desired adjustment path via the sensor device 3. For example, in an (unimpeded) obstacle detection process a door brake is activated electronically and therefore an adjustment of the side door 1 for opening or closing is blocked by an adjustment force which is applied by a user himself/herself.

Figure 3:
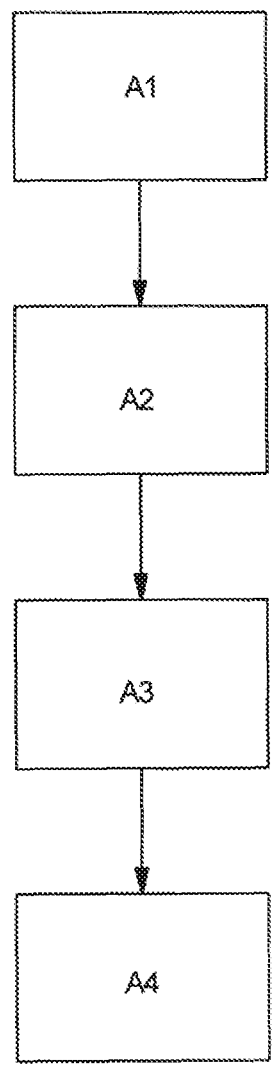
FIG. 3 shows a flowchart for an embodiment variant of a proposed method, such as for adjusting a tailgate or a side door according to FIGS. 1 and 2.

FIG. 3 also shows by way of example the sequence of an embodiment variant of a method which can be implemented with the adjustment devices in FIGS. 1 and 2.

Here, in a first method step A1, extraneous-force-activated adjustment of the respective adjusting part on the vehicle F is started, for example adjustment of a tailgate or side door 1. In a following (or preceding) method step 2 electronic checking of the status of the sensor system with which an extraneous-force-activated adjustment movement of the respective adjusting part is monitored, in order to qualify or even quantify measuring uncertainty of the sensor system, for example using additional sensor devices on the vehicle F. After a current degree of uncertainty in respect of the functioning of the sensor system to be monitored has been determined, in a subsequent method step A3 a status indicator s is generated and transmitted to signaling means for signaling the uncertainty to a user. Such a signaling means can comprise, for example, the display element 4a, the loudspeaker element 4b and/or the drive motor of the adjusting device 2. Subsequent to this, in a method step A4 the adjustment movement, desired by the user, of the adjusting part 1 can be perceived, for example visually, acoustically and/or haptically, by the user, with simultaneous outputting of the status information relating to the uncertainty of the sensor system.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SYMBOLS

1 Vehicle door (adjusting part)
2 Adjusting device
3a, 3b Sensor device
4a Display element 4b Loudspeaker element
5 Sensor device
6 Remote control/mobile terminal (portable device)
Err Signal
F Vehicle
H Obstacle
K Bodywork
O Bodywork opening
S Status indicator
SE Electronic control system
T Sender/transmitter
V Adjustment direction
Φ Adjustment angle While exemplary embodiments are described above, it is not intended that these embodiments describe all possible forms of the invention. Rather, the words used in the changes may be made without departing from the spirit and scope of the invention. Additionally, the features of various implementing embodiments may be combined to form further embodiments of the invention.

The invention claimed is:

1. A method of adjusting an adjusting part of a vehicle, wherein either the adjusting part or the vehicle includes a sensor device configured to detect a possible obstacle disposed in an adjustment path of the adjusting part in order to block, stop and/or reverse an adjustment movement of the adjusting part, the method comprising:
   generating electronically a first degree of measurement certainty of the sensor device based on the sensor device's capability to detect the obstacle in the adjustment path prior to or during a first adjustment of the adjusting part;
   signaling, by at least one status indicator, first current status information based on the first degree of the measurement certainty to a user to inform the user of the first degree of measurement certainty;
   generating electronically a second degree of measurement certainty of the sensor device based on the sensor device's capability to detect the obstacle in the adjustment path prior to or during a second adjustment of the adjusting part, wherein the second degree of measurement certainty is different than the first; and
   signaling, by the at least one status indicator, second current status information based on the second degree of measurement certainty to the user to inform the user of the second degree of measurement certainty, wherein the second current status information is different than the first current status information.

2. The method of claim 1, wherein the first current status information and the second current status information are each perceived visually, acoustically and/or haptically by the user.

3. The method of claim 2, wherein the first current status information and the second current status information are each signaled to the adjusting part and/or to a device carried by the user.

4. The method of claim 2, wherein signaling the first current status information step or signaling the second current status information step includes signaling a lighting element or a display.

5. The method of claim 2, wherein signaling the first current status information step or signaling the second current status information step includes signaling by at least one loudspeaker element.

6. The method of claim 2, wherein signaling the first current status information step or signaling the second current status information step includes signaling by an adjustment characteristic, wherein the adjustment characteristic is at least temporarily different during an extraneous-force-activated adjustment movement of the adjusting part.

7. The method of claim 6, wherein the signaling by the adjustment characteristic includes varying speed, acceleration, or a time for an acceleration of the adjustment movement and/or varying intensity of a vibration of the adjusting part based on either the first degree of measurement certainty or the second degree of measurement certainty.

8. The method of claim 1, wherein the first degree of measurement certainty and/or the second degree of measurement certainty is based on measured values previously acquired by means of the sensor device.

9. The method of claim 8, wherein the first degree of measurement certainty and/or the second degree of measurement certainty is based at least partially on a standard deviation of the measured values and/or a measured value history.

10. The method of claim 1, further comprising signaling, by another status indicator, third current status information based on another signal of another sensor device.

11. The method of claim 10, wherein the sensor device directly or indirectly detects the possible obstacle and the other sensor device indirectly or directly detects the obstacle.

12. The method of claim 10, wherein the signaling the third current status information is based on the at least one signal of the sensor device and on the other signal of the other sensor device.

13. The method of claim 1, wherein the first adjustment of the adjusting part or the second adjustment of the adjusting part includes
   applying an extraneous force to the adjusting part.

14. The method of claim 1, wherein the signaling the first current status step includes
   automatically opening and/or closing the adjusting part at a first speed, and the signaling the second current status step includes
   automatically opening and/or closing the adjusting part at a second speed, wherein the first degree of measurement certainty is greater than the second measurement certainty monitored by the user
   wherein the second speed is less than the first speed.

15. An adjusting device configured to control an adjustment and an adjustment movement of an adjusting part of a vehicle, and including at least one sensor device configured to detect a possible obstacle in an adjustment path of the adjusting part in order to block, to stop and/or to reverse the adjustment movement, the adjusting device comprising:
   an electronic control system configured to:
      generate a first degree of measurement certainty of the sensor device based on the sensor's device capability to detect the obstacle in the adjustment path, in response to receiving a first operator control request to adjust the adjusting part,
      signal first current status information based on the first degree of the measurement certainty to a user to inform the user of the first degree of measurement certainty,
      generate a second degree of measurement certainty of the sensor device based on the sensor device's capability to detect the obstacle in the adjustment path, in response to receiving a second operator control request to adjust the adjusting part, wherein the second degree of measurement certainty is different than the first degree of measurement certainty, and signal second current status information, based on the second degree of measurement certainty, to the user to inform the user of the second degree of measurement certainty, wherein the second current status information is different than the first current status information.

16. The adjusting device of claim 15, wherein the electronic control system is configured to activate the adjusting device in response to an application of an extraneous force to the adjusting part.

17. The adjusting device of claim 16, wherein the controller is further configured to brake the adjusting device in response detection of the possible obstacle and to the application of the extraneous force to the adjusting part.

18. The adjusting device of claim 15, wherein the first degree of measurement certainty is greater than the second degree of measurement certainty, and the controller is further configured to, responsive to the first degree of measurement certainty, automatically adjust the adjusting part at a first speed.

19. The adjusting device of claim 18, wherein the controller is further configured to, responsive to the second degree of measurement certainty, automatically adjust the adjusting part a second speed, wherein the second speed is less than the first speed.

\* \* \* \* \*